(12) United States Patent
Wada

(10) Patent No.: US 11,018,441 B2
(45) Date of Patent: May 25, 2021

(54) WIRELESS MODULE

(71) Applicant: FUJIKURA LTD., Tokyo (JP)

(72) Inventor: Hideyuki Wada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/644,579

(22) PCT Filed: May 16, 2018

(86) PCT No.: PCT/JP2018/018844
§ 371 (c)(1),
(2) Date: Mar. 5, 2020

(87) PCT Pub. No.: WO2019/058636
PCT Pub. Date: Mar. 28, 2019

(65) Prior Publication Data
US 2021/0066815 A1    Mar. 4, 2021

(30) Foreign Application Priority Data

Sep. 19, 2017    (JP) .............................. JP2017-178550

(51) Int. Cl.
*H01Q 21/12*    (2006.01)
*H01Q 13/08*    (2006.01)
(Continued)

(52) U.S. Cl.
CPC ............. *H01Q 21/12* (2013.01); *H01Q 13/08* (2013.01); *H04B 1/0483* (2013.01); *H04B 1/3805* (2013.01)

(58) Field of Classification Search
CPC ........ H01Q 21/06; H01Q 21/12; H01Q 13/08; H01Q 23/00
See application file for complete search history.

(56) References Cited

U.S. PATENT DOCUMENTS 3,987,455 A    10/1976    Olyphant, Jr.
3,995,277 A    11/1976    Olyphant, Jr.
(Continued)

FOREIGN PATENT DOCUMENTS

EP    0474393 A2    3/1992
JP    2014-195203 A    10/2014
(Continued)

OTHER PUBLICATIONS

International Search Report dated Jul. 31, 2018, issued in counterpart application No. PCT/JP2018/018844 , w/English translation (5 pages).

*Primary Examiner* — Daniel Munoz
(74) *Attorney, Agent, or Firm* — Westerman, Hattori, Daniels & Adrian, LLP

(57) ABSTRACT

A high gain of an antenna is achieved while suppressing interference of a radio wave from an RFIC. A plurality of serial-type radiation element rows 41 are arranged in parallel. A parallel feed line 45 branches from a feed terminal of an electronic component 11, and connects radiation elements 42, at ends of the serial-type radiation element row 41 farthest from the electronic component 11, to the feed terminal of the electronic component 11. All of the serial-type radiation element rows have an identical path length, along the parallel feed line 45, from each of the radiation elements 42 at the ends farthest from the electronic component 11 to the feed terminal of the electronic component 11. An amplifier 61 is connected to the parallel feed line on a halfway portion of the parallel feed line 45. The amplifier 61 amplifies a signal passing through the parallel feed line 45.

2 Claims, 3 Drawing Sheets

(51) Int. Cl.
 *H04B 1/04* (2006.01)
 *H04B 1/3805* (2015.01)

(56) References Cited

U.S. PATENT DOCUMENTS

| | | |
|---|---|---|
| 5,115,245 A | 5/1992 | Wen et al. |
| 2016/0218420 A1 | 7/2016 | Leung et al. |
| 2020/0365977 A1* | 11/2020 | Matsumaru .......... H01Q 1/2283 |

FOREIGN PATENT DOCUMENTS

| | | |
|---|---|---|
| JP | 2015-167293 A | 9/2015 |
| JP | 2017501371 A | 1/2017 |
| WO | 2015050994 A1 | 4/2015 |

\* cited by examiner

WIRELESS MODULE

TECHNICAL FIELD

The present invention relates to a wireless module used in a frequency band of a high frequency such as a microwave and a millimeter wave.

BACKGROUND ART

Patent Literature 1 discloses a slot array antenna that supplies electric power using a waveguide.

Patent Literature 2 discloses a microstrip array antenna employing a serial feed system. Specifically, a linear feed line and a plurality of stubs are formed on a front surface of a dielectric substrate, and these stubs are aligned along the feed line and extend from the feed line in a direction orthogonal to the feed line. Further, a plurality of parasitic elements are formed on the front surface of the dielectric substrate, and two or three parasitic elements are disposed around each one stub. A waveguide is provided on aback surface of the dielectric substrate, and a signal wave is input to an input end of the feed line via the waveguide.

CITATION LIST

Patent Literature

Patent Literature 1: Japanese Patent Application Publication No. 2014-195203
Patent Literature 2: Japanese Patent Application Publication No. 2015-167293

SUMMARY OF INVENTION

Technical Problem

The waveguides described in Patent Literatures 1 and 2 are not configured to transmit a signal wave using a conductive wiring line. Thus, an amplifier for amplifying a signal wave cannot be provided on a halfway portion of the waveguide. Accordingly, when a transmission loss is caused by attenuation of a signal wave and the like, it is not possible to easily compensate for the amount of such a loss. In a case of the microstrip array antenna described in Patent Literature 2, even if the number of stubs and parasitic elements is increased to achieve a high gain, the path length of the feed line increases, so that a transmission loss in the feed line increases. As a result, it is not possible to achieve a high gain of an antenna.

In a case of the microstrip array antenna described in Patent Literature 2, since the stubs and the parasitic elements are aligned along the feed line, a phase of a signal wave is delayed with increasing distance from an input end of the feed line. Thus, the microstrip array antenna radiates a radio wave having a strong intensity in a direction inclined to the input end side of the feed line with respect to a normal direction of the dielectric substrate. However, a radio frequency integrated circuit (RFIC) is provided in an input port of the waveguide, and thus such a radio wave is subject to interference from the RFIC.

The present disclosure has been achieved in view of the circumstances described above. An object of the present disclosure is to achieve a high gain of an antenna while suppressing interference of a radio wave caused by an RFIC.

Solution to Problem

A wireless module to solve an issue described above includes: a dielectric substrate; a conductive ground layer formed on one surface of the dielectric substrate; a plurality of serial-type radiation element rows arranged in parallel on another surface of the dielectric substrate; a radio frequency integrated circuit (RFIC) that is surface-mounted on the other surface of the dielectric substrate and includes a feed terminal; a parallel feed line that is formed on the other surface of the dielectric substrate, and supplies high-frequency electric power between the feed terminal of the RFIC and the plurality of serial-type radiation element rows; and an amplifier that is connected to the parallel feed line on a halfway portion of the parallel feed line, and amplifies a signal passing through the parallel feed line, the plurality of serial-type radiation element rows each including a plurality of radiation elements, the plurality of radiation elements being connected in series and aligned linearly at regular intervals in a direction approaching to the RFIC, the parallel feed line branching into the number of the plurality of serial-type radiation element rows from the feed terminal of the RFIC to the radiation elements, at ends of the serial-type radiation element rows farthest from the RFIC, in the plurality of radiation elements in the plurality of serial-type radiation element rows, and connecting the feed terminal of the RFIC to the radiation elements at the ends farthest from the RFIC, all of the plurality of serial-type radiation element rows having an identical pitch between the plurality of radiation elements, all of the plurality of serial-type radiation element rows having an identical path length, along the parallel feed line, from each of the radiation elements at the ends farthest from the RFIC to the feed terminal of the RFIC.

Other features of the present disclosure will become apparent from the following description and the drawings.

Advantageous Effects of Invention

According to some of the embodiments of the present disclosure, a high-gain antenna can be provided while suppressing interference of a radio wave caused by an RFIC.

DESCRIPTION OF EMBODIMENTS

Figure 1:
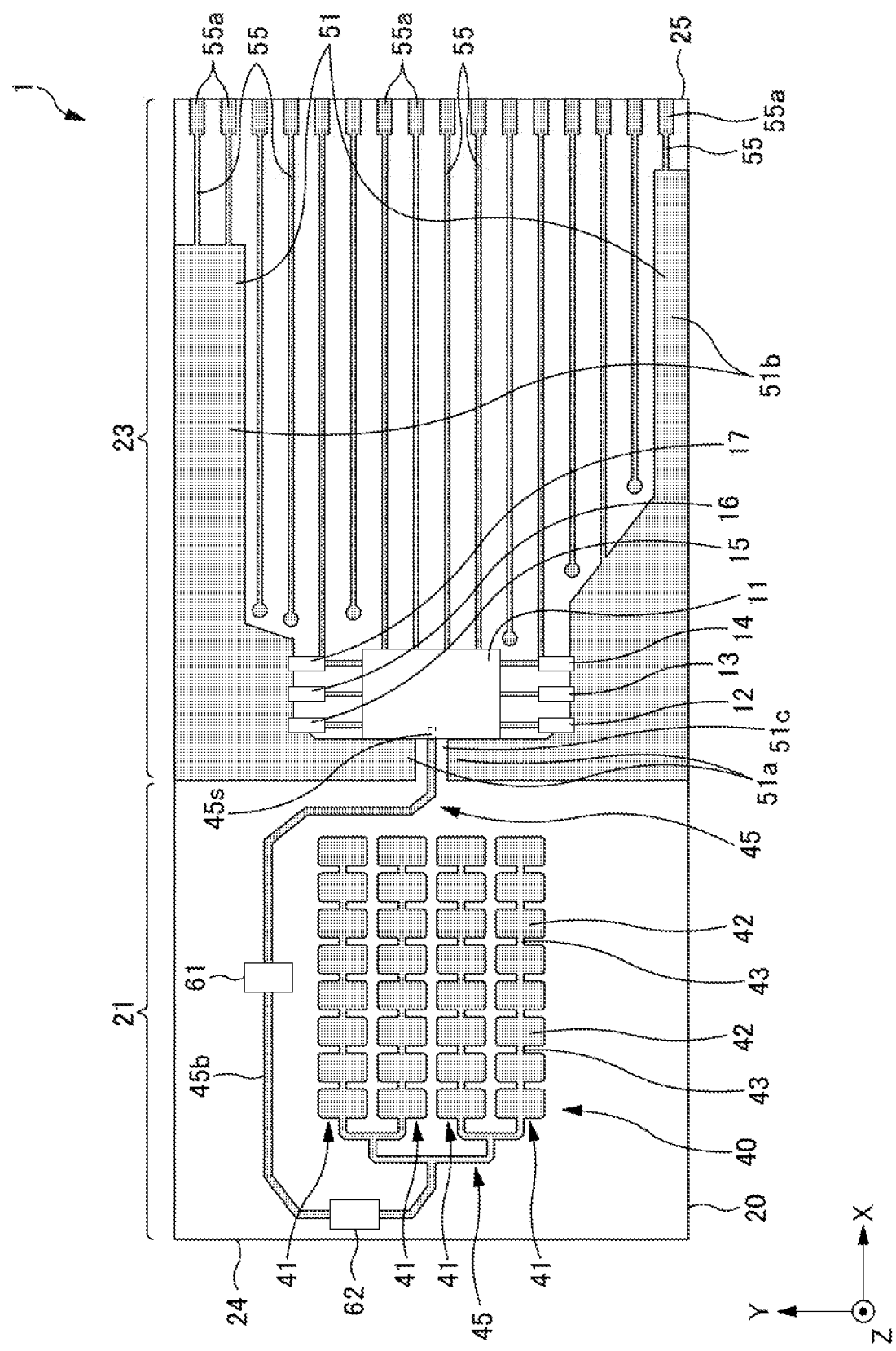
FIG. 1 is a plan view of a wireless module.

At least the following matters are made clear from the following description and the drawings.

A wireless module will become apparent, the wireless module comprising: a dielectric substrate; a conductive ground layer formed on one surface of the dielectric substrate; a plurality of serial-type radiation element rows arranged in parallel on another surface of the dielectric substrate; a radio frequency integrated circuit (RFIC) that is surface-mounted on the other surface of the dielectric substrate and includes a feed terminal; a parallel feed line that is formed on the other surface of the dielectric substrate, and supplies high-frequency electric power between the feed terminal of the RFIC and the plurality of serial-type radiation element rows; and an amplifier that is connected to the parallel feed line on a halfway portion of the parallel feed line, and amplifies a signal passing through the parallel feed line, the plurality of serial-type radiation element rows each including a plurality of radiation elements, the plurality of radiation elements being connected in series and aligned linearly at regular intervals in a direction approaching to the RFIC, the parallel feed line branching into the number of the plurality of serial-type radiation element rows from the feed terminal of the RFIC to the radiation elements, at ends of the serial-type radiation element rows farthest from the RFIC, in the plurality of radiation elements in the plurality of serial-type radiation element rows, and connecting the feed terminal of the RFIC to the radiation elements at the ends farthest from the RFIC, all of the plurality of serial-type radiation element rows having an identical pitch between the plurality of radiation elements, all of the plurality of serial-type radiation element rows having an identical path length, along the parallel feed line, from each of the radiation elements at the ends farthest from the RFIC to the feed terminal of the RFIC.

In the wireless module described above, the plurality of serial-type radiation element rows have an identical path length, along the parallel feed line, from each of the radiation elements at the ends farthest from the RFIC to the feed terminal of the RFIC. Thus, electric power in the same phase is supplied to the radiation elements that are disposed in position in the same order from the radiation elements at the ends farthest from the RFIC. Thus, the plurality of serial-type radiation element rows radiate a radio wave having a strong intensity in a direction inclined to the side opposite to the RFIC with respect to a normal direction of the dielectric substrate. Therefore, a radio wave transmitted and received by the plurality of serial-type radiation element rows are less likely to be subject to interference from the RFIC.

The plurality of radiation elements are arranged in a grid pattern as the entire of the plurality of serial-type radiation element rows. Accordingly, the number of the radiation elements is large, and the area of a range in which the radiation elements are occupied is also large. Thus, the serial-type radiation element rows achieve a high gain.

Whereas, the parallel feed line connects the radiation elements, at the ends of the serial-type radiation element rows farthest from the RFIC, to the feed terminal of the RFIC. Accordingly, a transmission path length of a signal wave in the parallel feed line increases. This may cause a transmission loss. However, the amplifier is connected to the parallel feed line on the halfway portion of the parallel feed line, and thus can compensate for the amount of the transmission loss.

It is preferable that the parallel feed line branches into a tree shape from the feed terminal of the RFIC to the radiation elements at the ends farthest from the RFIC, and the amplifier is connected to the parallel feed line in a path of the parallel feed line from the feed terminal to a first branch.

Accordingly, a signal can be amplified for all of the serial-type radiation element rows. Further, the number of amplifiers can be reduced, without providing the amplifier for each of the serial-type radiation element rows.

Embodiments

Embodiments of the present disclosure are described below with reference to the drawings. Note that, although various limitations that are technically preferable for implementing the present disclosure are imposed on the embodiments to be described below, the scope of the present disclosure is not to be limited to the embodiments below and illustrated examples.

1. Overview of Wireless Module

Figure 2:
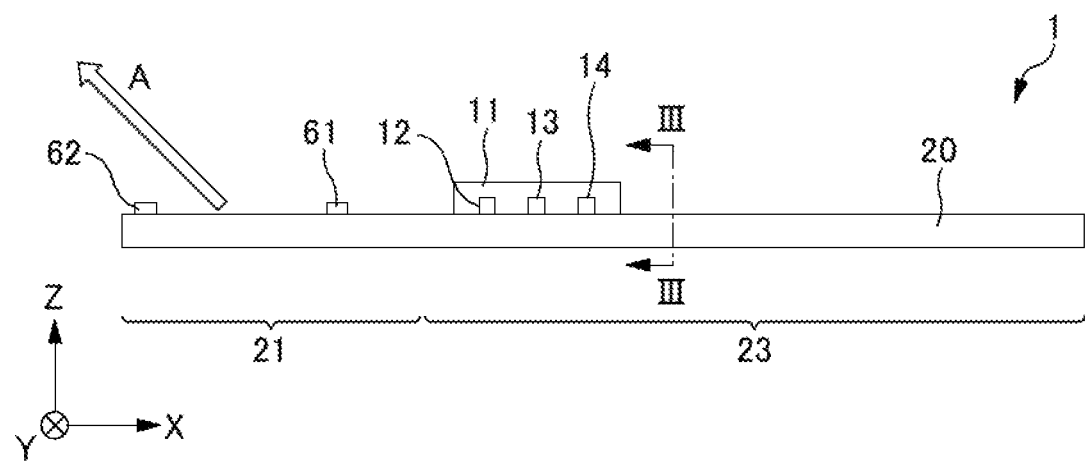
FIG. 2 is a side view of the wireless module.
Figure 3:
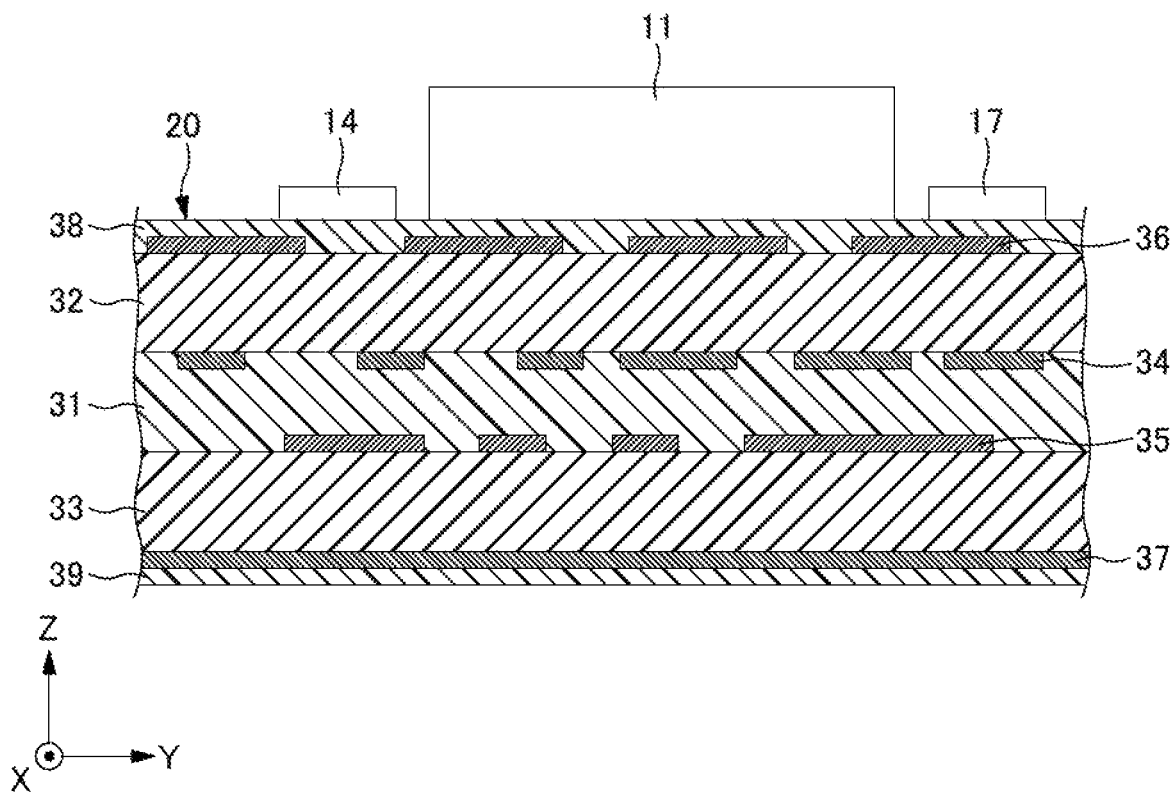
FIG. 3 is a cross-sectional view of the wireless module.
Figure 4:
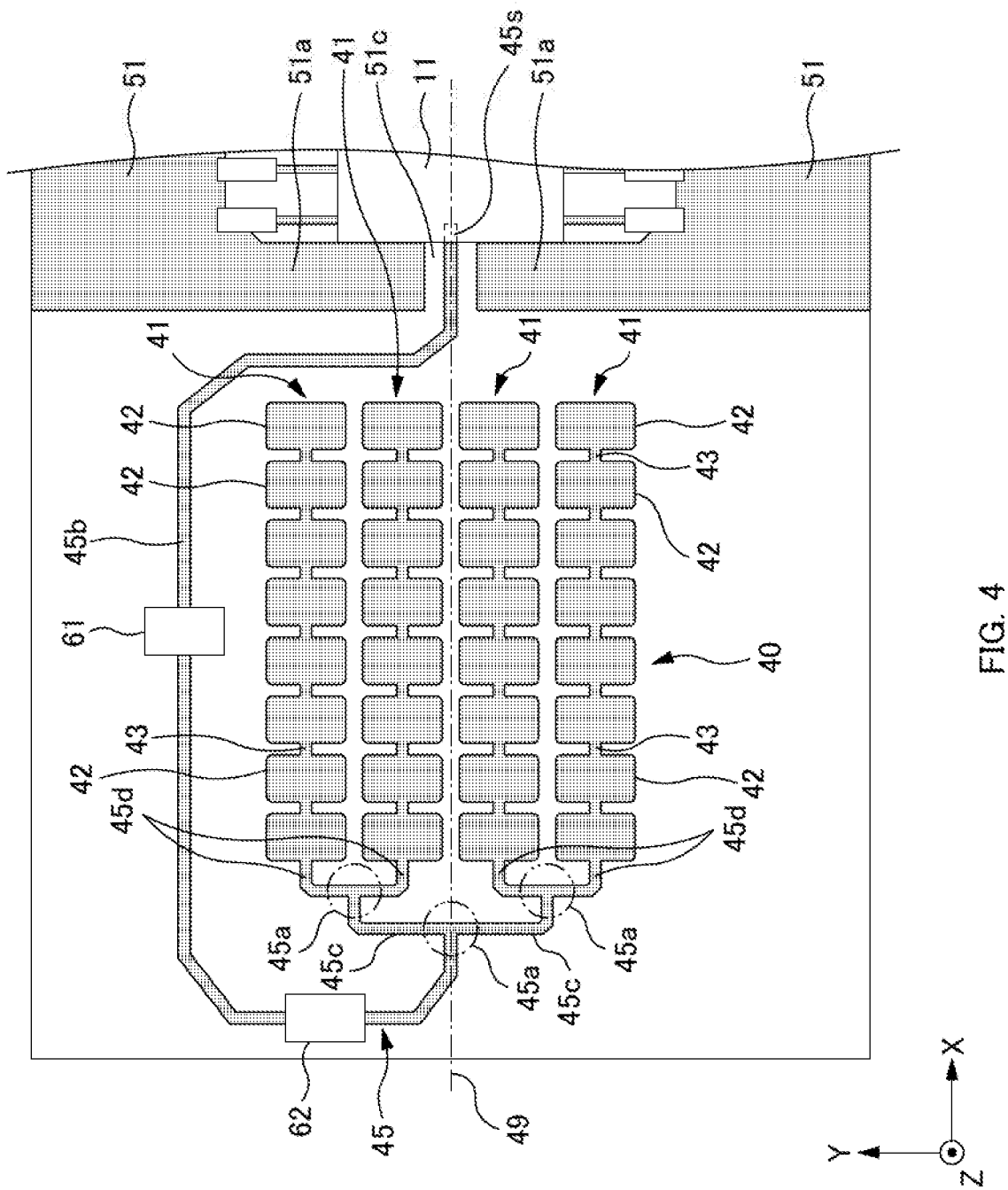
FIG. 4 is an enlarged plan view of a main part of the wireless module.

FIG. 1 is a plan view of a wireless module 1. FIG. 2 is a side view of the wireless module 1. FIG. 3 is a cross-sectional view taken along III-III in FIG. 2. FIG. 4 is an enlarged plan view of a main part of the wireless module 1. In the drawings, an X axis, a Y axis, and a Z axis are illustrated as auxiliary lines or symbols representing directions. The X axis, the Y axis, and the Z axis are orthogonal to each other.

As illustrated in FIGS. 1 and 2, the wireless module 1 is a module that transmits, receives, or transmits and receives a radio wave in a frequency band of a microwave or a millimeter wave. The wireless module 1 includes a planar array antenna 20, electronic components 11 to 17 that are surface-mounted on a front surface of the planar array antenna 20, and amplifiers 61 and 62 that are surface-mounted on the front surface of the planar array antenna 20. Here, the X axis illustrated in FIGS. 1 to 3 is parallel to long sides of the planar array antenna 20 having a rectangular shape, the Y axis is parallel to short sides 24 and 25 of the planar array antenna 20, and the X axis and the Y axis are parallel to the front surface and a back surface of the planar array antenna 20.

2. Planar Array Antenna

As illustrated in FIG. 3, the planar array antenna 20 is a multilayer wiring board. The planar array antenna 20 includes a dielectric adhesive layer 31, dielectric base materials 32 and 33, conductive pattern layers 34, 35, and 36, a conductive ground layer 37, and passivation films 38 and 39.

The dielectric base material 32 having a thin plate shape and the dielectric base material 33 having a thin plate shape are bonded together using the dielectric adhesive layer 31. In this way, the dielectric base material 32, the dielectric adhesive layer 31, and the dielectric base material 33 are laminated in this order, and such a laminated body thereof results in a dielectric substrate. The dielectric base materials 32 and 33 are made of, for example, resin (such as a liquid crystal polymer, a polyimide, and polyethylene terephthalate), fiber-reinforced resin (such as glass cloth epoxy resin), fluoropolymer, or ceramic. The dielectric adhesive layer 31 is made of, for example, epoxy resin.

The conductive pattern layer 34 is formed between the dielectric base material 32 and the dielectric adhesive layer 31, and the conductive pattern layer 35 is formed between the dielectric base material 33 and the dielectric adhesive layer 31. The conductive pattern layers 34 and 35 are coated with the dielectric adhesive layer 31 by bonding the dielectric base material 32 to the dielectric base material 33 using the dielectric adhesive layer 31. Here, the conductive pattern layer 34 is acquired by shape-processing (patterning) a conductive layer (such as a metal plating layer) formed on a surface of the dielectric base material 32 on the dielectric adhesive layer 31 side by a photolithography method, an etching method, or the like. The same applies to the conductive pattern layer 35.

The conductive pattern layer 36 is formed on a surface of the dielectric base material 32 on a side opposite to the dielectric adhesive layer 31. Furthermore, the passivation film 38 is formed on the surface so as to coat the conductive pattern layer 36. The conductive pattern layer 36 is acquired by shape-processing a conductive layer formed on the dielectric base material 32 by a photolithography method, an etching method, and the like. The conductive pattern layer 36 will be described later in detail.

The conductive ground layer 37 is formed on a surface of the dielectric base material 33 on a side opposite to the dielectric adhesive layer 31. Furthermore, the passivation film 39 is formed on the surface so as to coat the conductive ground layer 37. The conductive ground layer 37 is acquired by shape-processing a conductive layer formed on the dielectric base material 33 by a photolithography method, an etching method, and the like. Note that the conductive ground layer 37 may be a layer formed on the entire surface of the dielectric base material 33 on the side opposite to the dielectric adhesive layer 31 without patterning.

The passivation films 38 and 39 are formed of an insulating dielectric material. The passivation film 38 protects the dielectric base material 32 and the conductive pattern layer 36, and the passivation film 39 protects the dielectric base material 33 and the conductive ground layer 37.

3. Electronic Component and Amplifier

As illustrated in FIGS. 2 and 3, the electronic components 11 to 17 and the amplifiers 61 and 62 are surface-mounted on the front surface of the planar array antenna 20 as described above, in other words, on the surface of the dielectric base material 32 on the side opposite to the dielectric adhesive layer 31. A mounting position of the electronic component 11 is at a central portion of the planar array antenna 20. The electronic components 12 to 17 are disposed around the electronic component 11. Here, when the planar array antenna 20 is partitioned into a rectangular region 21 on one short side 24 side and a rectangular region 23 on the other short side 25 side, the electronic components 11 to 17 are disposed closer to the rectangular region 21 in the rectangular region 23. The amplifiers 61 and 62 are disposed in the rectangular region 21.

The electronic component 11 is a so-called radio frequency integrated circuit (RFIC), and is configured with an integrated circuit (IC) that includes a reception circuit, a transmission circuit, or both of them, and the like. Note that the reception circuit incorporated into the electronic component 11 is configured with, for example, a tuning circuit, a demodulation circuit, an amplifier, and the like, and the transmission circuit incorporated into the electronic component 11 is configured with, for example, an oscillation circuit, a modulation circuit, an amplifier, and the like.

A terminal of the electronic component 11 is connected to the conductive pattern layer 36 by, for example, a ball grid array (BGA) method or a land grid array (LGA) method by using solder and the like. The electronic components 12 to 17 each are, for example, a resistor, a capacitor, an inductor (coil), or an oscillator. Each terminal of the electronic components 12 to 17 is connected to the conductive pattern layer 36 by using solder and/or the like.

The amplifiers 61 and 62 each are, for example, a pre-amplifier (when the electronic component 11 is a transmission circuit) or a low noise amplifier (when the electronic component 11 is a reception circuit). A power amplifier may be used as the amplifiers 61 and 62.

4. Conductive Pattern Layer of Planar Array Antenna

As described above, the conductive pattern layer 36 is patterned (shape-processed), and thus the conductive pattern layer 36 will be described with reference to FIGS. 1 and 4. In FIGS. 1 and 4, the conductive pattern layer 36 is drawn with a dotted pattern, and also the passivation film 38 is omitted in order to make the conductive pattern layer 36 easier to see.

By patterning the conductive pattern layer 36, the conductive pattern layer 36 is provided with $2^n$ rows (n is an integer of one or more) of serial-type radiation element rows 41, a parallel feed line 45 of $2^n$ distributions, a pair of conductive ground portions 51, and a large number of wiring lines 55. In the examples illustrated in FIGS. 1 and 4, n is two, and the number of the serial-type radiation element rows 41 is four, but the number of the serial-type radiation element rows 41 may be greater. As the number of the serial-type radiation element rows 41 increases, a gain of an antenna increases. Note that a "serial-type radiation element row" is abbreviated as the "element row" in the following description.

The conductive ground portions 51 in a pair are respectively formed on two end portions in the Y direction of the rectangular region 23, and have a gap between the conductive ground portions 51 in a pair. The width of a gap 51c between portions 51a of the conductive ground portions 51 closer to the rectangular region 21 is narrower than a gap between remaining portions 51b. Note that the electronic components 11 to 17 are disposed on the short side 25 side of the planar array antenna 20 with respect to the portions 51a of the conductive ground portions 51 closer to the rectangular region 21, and are disposed in the gap between the remaining portions 51b.

The conductive ground portion 51 is connected to the terminals of the electronic components 11 to 17, and a reference potential (ground potential) is applied to the terminals of the electronic components 11 to 17 from the conductive ground portion 51. Further, the conductive ground portion 51 is connected to the conductive ground layer 37 (see FIG. 3) through a via hole, and the reference potential is applied to the conductive ground portion 51 from the conductive ground layer 37.

The wiring lines 55 are formed in the rectangular region 23 so as to be routed in a long-side direction (X direction) of the planar array antenna 20 from the short side 25 of the planar array antenna 20 toward the rectangular region 21. An end portion 55a of each of the wiring lines 55 is formed in an island shape so as to have a width greater than the widths of other portions. Such end portions 55a of the wiring lines 55 are aligned along the short side 25 of the planar array antenna 20. The end portions 55a of the wiring lines 55 are connecting terminals. The end portions 55a of the wiring lines 55 are exposed without being covered with the passivation film 38, and are connected to the terminals of another device when the wireless module 1 is mounted on the other device.

Some of the wiring lines 55 are routed from the short side 25 of the planar array antenna 20 to the conductive ground portion 51, and are connected to the conductive ground portion 51. The rest of the wiring lines 55 are routed from the short side 25 of the planar array antenna 20 to the vicinity of the electronic components 11 to 17 in the gap between the pair of conductive ground portions 51. Some of the rest of the wiring lines 55 are directly connected to the terminals of the electronic components 11 to 17. Some of the rest the wiring lines 55 are connected to the terminals of the electronic components 11 to 17 via a via hole, the conductive pattern layers 34 and 35, and/or the like. Some of the rest of the wiring lines 55 are connected to terminals of the amplifiers 61 and 62 via a via hole, the conductive pattern layers 34 and 35, and/or the like. The wiring lines 55 connected to the terminals of the electronic components 11 to 17 include power supply lines for supplying a power supply voltage to the electronic component 11, a clock line for supplying an operation clock to the electronic component 11, signal lines for supplying various signals to the electronic components 11 to 17, and the like. The wiring lines 55 connected to the terminals of the amplifiers 61 and 62 via a via hole, the conductive pattern layers 34 and 35, and/or the like are power supply lines for supplying a power supply voltage to the amplifiers 61 and 62.

The $2^n$ rows of the element rows 41 are formed in the rectangular region 21. Each of the element rows 41 includes a plurality of patch-type radiation elements 42 and direct-coupled feed lines 43. In the examples illustrated in FIGS.

1 and 4, each of the element rows 41 includes 8 radiation elements 42, but the number thereof may be two to seven, or may be nine or more. The larger the number of the radiation elements 42 included in the element row 41, the higher the gain of an antenna. The number of the radiation elements 42 is preferably increased as much as possible according to the size and shape of the rectangular region 21.

In any of the element rows 41, the plurality of radiation elements 42 are linearly aligned in a direction approaching the electronic component 11. More specifically, in any of the element rows 41, the plurality of radiation elements 42 are aligned linearly at regular intervals in the long-side direction (X direction) of the planar array antenna 20. The radiation elements 42 are connected in series using the direct-coupled feed lines 43 provided between the radiation elements 42 adjacent to each other.

The foregoing $2^n$ rows of the element rows 41 are parallel to each other. The element rows 41 are arranged in parallel at regular intervals in a short-side direction (Y direction) of the planar array antenna 20, and thus the plurality of radiation elements 42 are arranged in a grid pattern as the entire of the element rows 41.

The radiation elements 42, at the ends of the respective element rows 41 farthest from the electronic component 11, in the respective element rows 41 are aligned in terms of their positions in the X direction. In other words, the radiation elements 42, at the ends farthest from the electronic component 11, in the respective element rows 41 are arranged in a line in a direction (Y direction) perpendicular to a direction (X direction) of the element rows 41.

All the intervals between the element rows 41 adjacent to each other (interval between the radiation elements 42 adjacent to each other in the Y direction) are identical. An interval between the radiation elements 42 adjacent to each other in the Y direction and an interval between the radiation elements 42 adjacent to each other in the X direction may be identical or different. Hereinafter, $2^n$ rows of the element rows 41 being arranged in parallel are referred to as a radiation element array 40.

The radiation element array 40 is formed to be line symmetric with respect to a symmetrical line 49. The symmetrical line 49 is parallel to the X direction, i.e., the direction of the element rows 41 and passes through the feed end point 45s, i.e., the feed terminal of the electronic component 11, of the parallel feed line 45 described later. Since the number of the element rows 41 is an even number, none of the element rows 41 is disposed on the symmetrical line 49.

In order to allow the radiation element array 40 to function as a microstrip antenna, the conductive ground layer 37 (see FIG. 3) is formed so as to spread in the entire rectangular region 21, and the dielectric adhesive layer 31 and the dielectric base materials 32 and 33 are interposed between the conductive ground layer 37 and the radiation element 42.

The microstrip-line-type parallel feed line 45 is formed in the rectangular region 21. The amplifiers 61 and 62 are provided on a halfway portion of the parallel feed line 45, and a signal passing through the parallel feed line 45 is amplified by the amplifiers 61 and 62. Note that the parallel feed line 45 is a microstrip-line-type signal transmission path, and the dielectric adhesive layer 31 and the dielectric base materials 32 and 33 are interposed between the parallel feed line 45 and the conductive ground layer 37 (see FIG. 3).

The parallel feed line 45 connects between $2^n$ rows of the element rows 41 and the feed terminal of the electronic component 11. A connecting portion between the parallel feed line 45 and the feed terminal of the electronic component 11 corresponds to the feed end point 45s of the parallel feed line 45.

When a transmission circuit is incorporated in the electronic component 11, the electronic component 11 supplies high-frequency electric power to the parallel feed line 45 through the feed terminal and the feed end point 45s. Then, the parallel feed line 45 distributes and transmits, to $2^n$ rows of the element rows 41, the high-frequency electric power supplied to the feed endpoint 45s by the electronic component 11.

On the other hand, when a reception circuit is incorporated in the electronic component 11, the parallel feed line 45 synthesizes high-frequency electric power generated in $2^n$ rows of the element rows 41 by reception of a radio wave, and transmits the high-frequency electric power to the electronic component 11 through the feed end point 45s and the feed terminal.

The parallel feed line 45 includes n stages of T-type distribution portions 45a, and is formed in a shape of a tree branching into $2^n$ from the feed end point 45s to the element rows 41 (particularly, the radiation elements 42 at the ends farthest from the electronic component 11) using the distribution portion 45a. Note that, in a case of reception of a radio wave, the distribution portion 45a is a synthesizing portion.

The number of the distribution portions 45a in an m-th stage (m is a given integer from one to n) from the feed terminal of the electronic component 11 is $2^{m-1}$. The distribution portion 45a in any of the stages is disposed in the region of the radiation element array 40 on the side opposite to the electronic component 11.

The distribution portion 45a in a first stage from the electronic component 11 is connected to the feed terminal of the electronic component 11 via a feed line 45b. A connecting portion between of the feed line 45b and the feed terminal of the electronic component 11 corresponds to the feed end point 45s of the parallel feed line 45.

The distribution portions 45a in stages adjacent to each other are connected using L-shaped feed lines 45c.

The distribution portions 45a in an n-th stage from the electronic component 11 are connected to the element rows 41 (particularly, the radiation elements 42 at the ends farthest from the electronic component 11) via L-shaped feed lines 45d.

The feed line 45b is routed in the following path, while avoiding the radiation element array 40, from the feed terminal of the electronic component 11 to the distribution portion 45a in the first stage. In other words, the feed line 45b extends from the gap 51c between the portions 51a of the conductive ground portions 51 closer to the rectangular region 21 to the negative side in the X-direction, is then bent to the positive side in the Y direction and extends to the positive side in the Y direction, is then further bent to the negative side in the X direction and extends to the negative side in the X direction, is then further bent to the negative side in the Y direction and extends to the negative side in the Y direction, is then further bent to the positive side in the X direction and extends to the positive side in the X direction, and is then connected to the distribution portion 45a in the first stage.

The feed line 45b is divided at two points. The amplifier 61 is mounted at a first dividing point. A portion on the feed end point 45s side with respect to the divided point is connected, via the amplifier 61, to a portion on the side of the distribution portion 45a in the first stage with respect to the dividing point. The amplifier 62 is mounted at a second dividing point. A portion on the feed end point 45s side with respect to the dividing point is connected, via the amplifier 62, to a portion on the side of the distribution portion 45a in the first stage with respect to the dividing point.

As described above, the amplifiers 61 and 62 are connected to any of the wiring lines 55 via a via hole, the conductive pattern layers 34 and 35, and/or the like, and a power supply voltage is supplied from the wiring line 55 to the amplifiers 61 and 62. The amplifiers 61 and 62 are operated with the power supply voltage, and amplify a signal passing through the feed line 45b. Note that the amplifier 62 may not only amplify a signal, but also compensate for a phase shift of a signal and/or compensate for a shift of a polarized wave of a signal. In other words, the amplifier 62 may also have a function as a phase compensator or a polarized wave converter.

In a case of transmission, each distribution portion 45a divides high-frequency electric power transmitted from the electronic component 11 or the distribution portion 45a in a previous stage into two, and transmits the high-frequency electric power to the distribution portions 45a in a subsequent stage or the element rows 41 (particularly, the radiation elements 42 at the ends farthest from the electronic component 11). Further, in a case of reception, each distribution portion 45a synthesizes high-frequency electric power transmitted from the distribution portions 45a in a subsequent stage or the element rows 41 (particularly, the radiation elements 42 at the ends farthest from the electronic component 11), and transmits the high-frequency electric power to the electronic component 11 or the distribution portion 45a in a previous stage.

All of the element rows 41 have an identical path length (electrical length) from each of the radiation elements 42 at the ends farthest from the electronic component 11 to the feed end point 45s of the parallel feed line 45 through the parallel feed line 45. Therefore, electric power in the same phase is supplied to all of the radiation elements 42 at the ends farthest from the electronic component 11.

Further, since the radiation element array 40 is formed to be line-symmetric with respect to the symmetrical line 49, electric power in the same phase is supplied to the radiation elements 42 arranged in positions symmetric to each other with respect to the symmetrical line 49. Furthermore, electric power in the same phase is supplied to the radiation elements 42 that are disposed in positions in the same order from the radiation elements 42 at the ends farthest from the electronic component 11.

The element rows 41 adopt a serial feed system. Thus, in the radiation elements 42 included in the same element row 41, the phase of power to be supplied is delayed as the radiation element 42 becomes distant from the parallel feed line 45. Thus, the radiation element array 40 has radio wave directivity (see an arrow A in FIG. 2) having the maximum radiation intensity in a direction inclined to the side distant from the electronic components 11 to 17 with respect to a normal direction of the planar array antenna 20. An angle of the maximum radiation intensity of the radiation element array 40 with reference to a normal line of the planar array antenna 20 is larger than 0° and smaller than 90°. Even if an angle of the maximum radiation intensity of the radiation element array 40 is inclined to the side distant from the electronic components 11 to 17 with respect to the normal direction of the planar array antenna 20 as indicated by the arrow A, radio wave interference from the electronic components 11 to 17 is not caused.

5. Advantageous Effects

The wireless module 1 configured as described above has the following advantageous effects.

(1) The radiation element array 40 includes the plurality of radiation elements 42 arranged in a grid pattern in the X direction and the Y direction. Thus, the number of the radiation elements 42 is large, and the area of the radiation element array 40 is large. Accordingly, it is possible to achieve a high gain of the radiation element array 40 and long distance transmission of a radio wave.

(2) All of the element rows 41 have an identical electrical length of the parallel feed line 45 from the radiation elements 42, farthest from the electronic component 11, in the respective element rows 41 to the feed terminal of the electronic component 11. Furthermore, all of the element rows 41 have an identical pitch in the X direction of the radiation elements 42 disposed in each of the element rows 41. Thus, electric power in the same phase is supplied to the radiation elements 42 disposed, in the same order, from the radiation elements 42 farthest from the electronic component 11. Thus, all of the element rows 41 have the same direction of the maximum radiation intensity direction, and a high gain of the radiation element array 40 can be achieved. Further, the angle of the maximum radiation intensity of the radiation element array 40 can be inclined to the normal direction of the planar array antenna 20.

(3) The parallel feed line 45 is connected to the radiation elements 42, farthest from the electronic component 11, in the respective element rows 41. Thus, as indicated by the arrow A, an angle of the maximum radiation intensity of the radiation element array 40 is inclined to the side distant from the electronic components 11 to 17 with respect to the normal direction of the planar array antenna 20. Thus, radio wave interference from the electronic components 11 to 17 can be suppressed.

(4) Although the advantageous effect as in the foregoing (3) is achieved, a transmission loss in the parallel feed line 45 increases. However, since the amplifiers 61 and 62 are provided on the halfway portion of the parallel feed line 45, a transmission signal is amplified. In this way, it is possible to compensate for the amount of a transmission loss.

(5) The amplifiers 61 and 62 are provided on the feed line 45b extending from the feed end point 45s to the first distribution portion 45a. Thus, a signal can be amplified for all of the element rows 41. Further, only the two amplifiers 61 and 62 are sufficient, without the need for an amplifier to be mounted for each element row 41.

(6) The two amplifiers 61 and 62 are connected in series. Thus, even when a signal transmitted between the amplifiers 61 and 62 is attenuated, it is possible to compensate for the amount of such a loss. When the amplifier 62 also functions as a phase compensator, it is possible to suppress an increase in phase delay or interference occurring in a signal transmitted through the parallel feed line 45. When the amplifier 62 also functions as a polarized wave converter, it is possible to suppress an increase in another polarized wave component in a signal transmitted through the parallel feed line 45. As a result, attenuation of a signal transmitted through the parallel feed line 45 can be suppressed.

(7) The parallel feed line 45 is formed in one layer without being provided across a plurality of layers. In other words, the parallel feed line 45 is not provided through a via hole or a through hole. Thus, a transmission loss caused by misalignment between layers does not occur in the parallel feed line 45.

(8) The electronic component 11 is mounted on the planar array antenna 20, and the feed terminal of the electronic component 11 is directly connected to the feed end point 45s of the parallel feed line 45. Thus, transmission loss between the electronic component 11 and the parallel feed line 45 can be reduced.

6. Modification Examples of Wireless Module

The embodiment of the present disclosure has been described above, but the embodiment described above is for facilitating the understanding of the present disclosure, and is not to be construed as limiting the present disclosure. Further, modifications or improvements may be made to the embodiment described above without departing from the gist of the present disclosure, and the present disclosure encompasses any equivalents thereof. Hereinafter, some modifications of the embodiment described above will be described.

(1) In the embodiment described above, n is an integer of one or more. As an example, FIGS. 2 and 4 are illustrated assuming that n is two. Since a higher gain of the radiation element array 40 can be achieved as n becomes greater, n may be three or more.

(2) In the embodiment described above, all of the element rows 41 have an equal number of the radiation elements 42. Whereas, the element rows 41 may vary in the number of the radiation elements 42. Even in this case, the number of the radiation elements 42 in the element row 41 in the s-th row (note that s is a given number from one to half of the total number of the element rows 41) counting from the symmetrical line 49 to the positive side in the Y direction is equal to the number of the radiation elements 42 in the element row 41 in the s-th row counting from the symmetrical line 49 to the negative side in the Y direction. In other words, the radiation element array 40 is formed to be line symmetric with respect to the symmetrical line 49.

REFERENCE SIGNS LIST

1: Wireless module;
11: Electronic component (RFIC);
20: Planar array antenna;
31: Dielectric adhesive layer;
32, 33: Dielectric base material;
37: Conductive ground layer;
41: Serial-type radiation element row;
42: Radiation element;
45: Parallel feed line;
45s: Feed end point;
61, 62: Amplifier.

The invention claimed is:

1. A wireless module comprising:
a dielectric substrate;
a conductive ground layer formed on one surface of the dielectric substrate;
a plurality of serial-type radiation element rows arranged in parallel on another surface of the dielectric substrate;
a radio frequency integrated circuit (RFIC) that is surface-mounted on the other surface of the dielectric substrate and includes a feed terminal;
a parallel feed line that is formed on the other surface of the dielectric substrate, and supplies high-frequency electric power between the feed terminal of the RFIC and the plurality of serial-type radiation element rows; and
an amplifier that is connected to the parallel feed line on a halfway portion of the parallel feed line, and amplifies a signal passing through the parallel feed line,
the plurality of serial-type radiation element rows each including a plurality of radiation elements, the plurality of radiation elements being connected in series and aligned linearly at regular intervals in a direction approaching to the RFIC,
the parallel feed line branching into the number of the plurality of serial-type radiation element rows from the feed terminal of the RFIC to the radiation elements, at ends of the serial-type radiation element rows farthest from the RFIC, in the plurality of radiation elements in the plurality of serial-type radiation element rows, and connecting the feed terminal of the RFIC to the radiation elements at the ends farthest from the RFIC,
all of the plurality of serial-type radiation element rows having an identical pitch between the plurality of radiation elements,
all of the plurality of serial-type radiation element rows having an identical path length, along the parallel feed line, from each of the radiation elements at the ends farthest from the RFIC to the feed terminal of the RFIC.

2. The wireless module according to claim 1, wherein
the parallel feed line branches into a tree shape from the feed terminal of the RFIC to the radiation elements at the ends farthest from the RFIC, and
the amplifier is connected to the parallel feed line in a path of the parallel feed line from the feed terminal to a first branch.

* * * * *